UNITED STATES PATENT OFFICE.

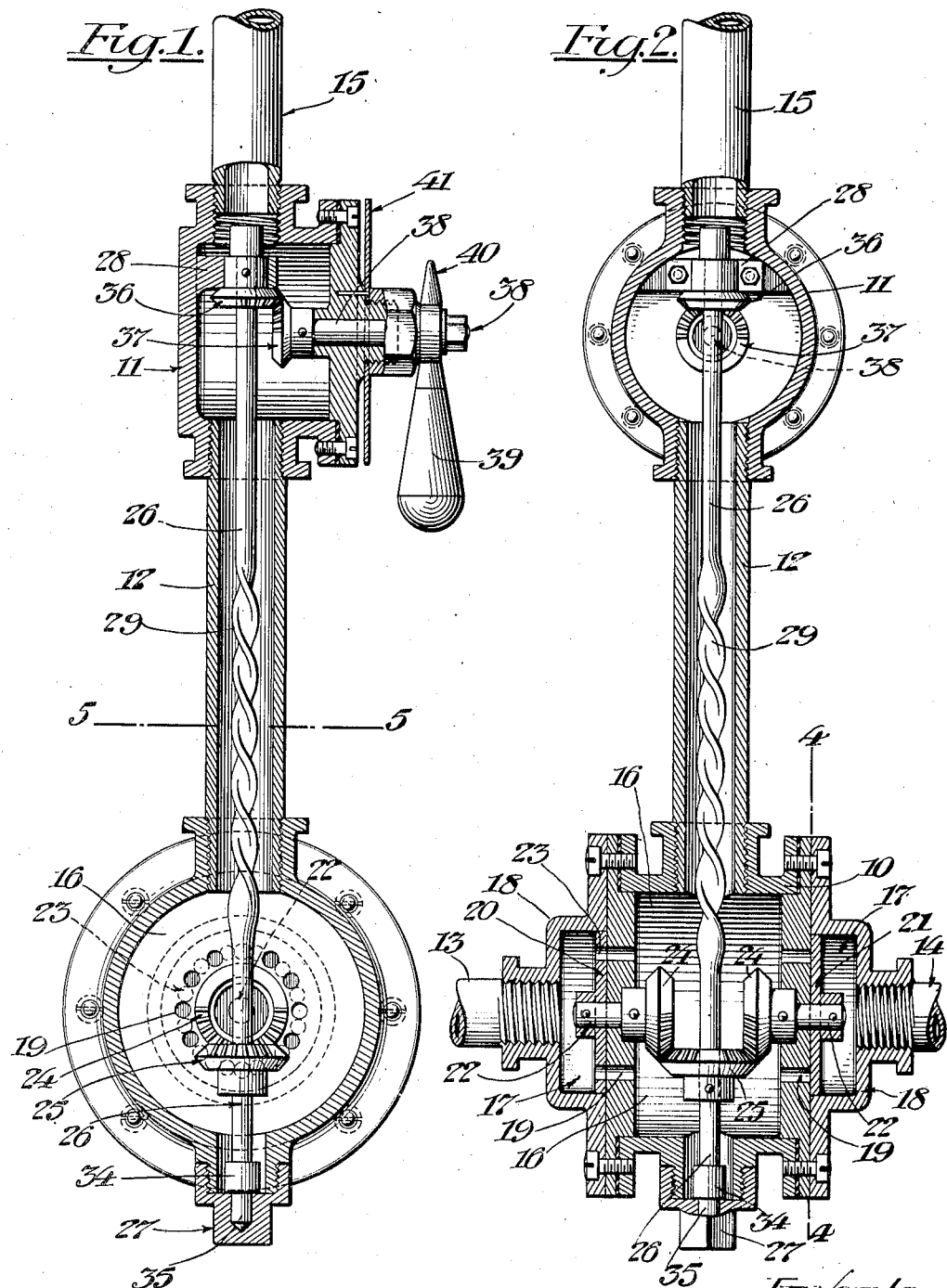

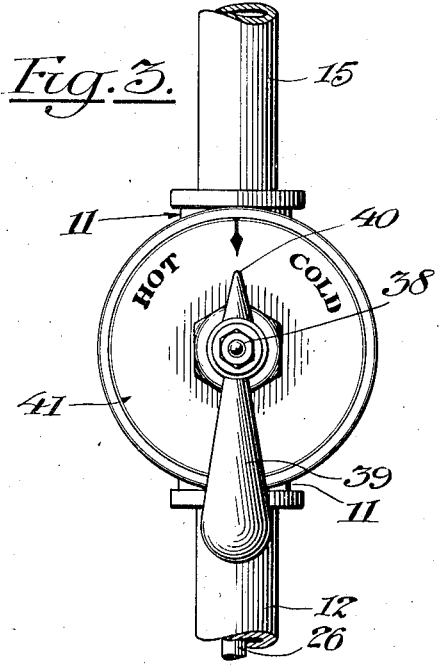
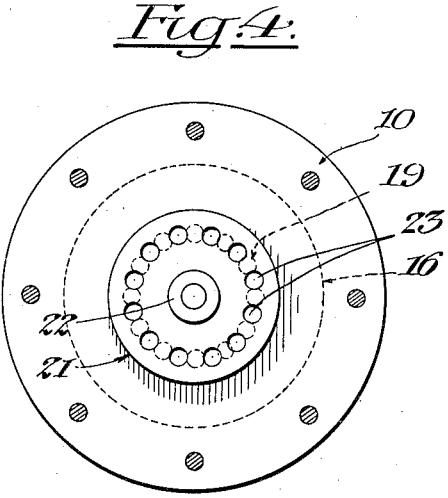
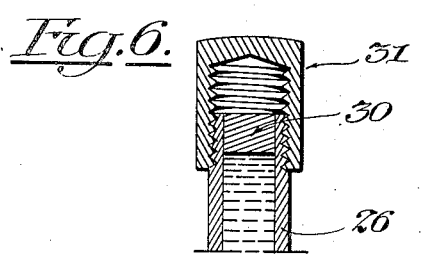
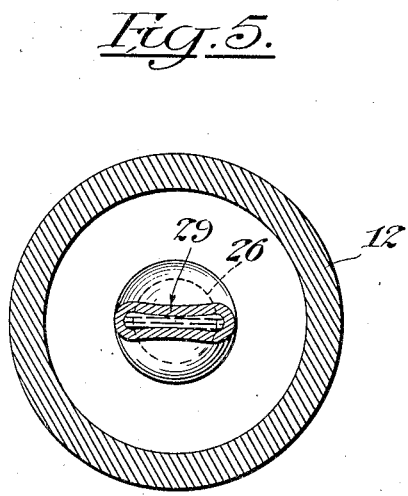
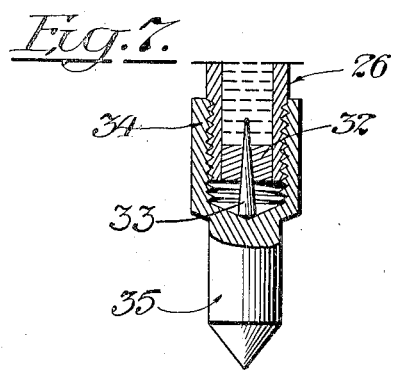

PAUL MIRK, OF NEW YORK, N. Y.

THERMOSTATIC VALVE-CONTROLLING APPARATUS.

1,408,120.   Specification of Letters Patent.   Patented Feb. 28, 1922.

Application filed November 16, 1920. Serial No. 424,437.

*To all whom it may concern:*

Be it known that I, PAUL MIRK, a citizen of the United States, and resident of the city of New York, in the county of New York and State of New York, have invented certain new and useful Improvements in Thermostatic Valve-Controlling Apparatus, of which the following is a specification.

This invention relates to thermostatic valve controlling apparatus; having reference more particularly to mechanism for use in connection with shower baths and other structures from which a supply of water at or below a certain maximum temperature is or may be desired.

The primary object of the invention is to provide a simple, compact and efficient apparatus which will automatically regulate the proportionate flow of cold and hot water to a common discharge element in such a manner as to effect and maintain the delivery of the water at or below a maximum temperature.

A further object is to provide a novel thermostatic device which is readily responsive to the influence of varying temperatures and which device has sufficient capacity, as to movement and force, to operate with certainty and positiveness the movable element controlled thereby.

My invention comprises various novel features of construction and combinations of parts which will be hereinafter described and claimed.

In the drawings—

Figure 1 is a vertical section, partly in elevation, of a thermostatic valve controlling apparatus embodying the principle of my invention.

Fig. 2 is a similar section, at a right angle to Fig. 1.

Fig. 3 is a front elevation of the regulating handle and indicator at the top of the apparatus.

Fig. 4 is a vertical section adjacent one of the heads of the mixing chamber, as on the line 4—4 of Fig. 2.

Fig. 5 is a transverse section, enlarged, through the thermostatic device and its encasing tube, as on the line 5—5 of Fig. 1.

Figs. 6 and 7 are vertical sections through the upper and lower ends, respectively, of said device.

The form of embodiment of my invention illustrated in the drawings comprises a hollow supporting structure constituted by two spaced-apart cylindrical casings 10, 11, and a tube 12 establishing communication between them. Two supply pipes 13, 14 for hot and cold water respectively, communicate with the interior of the casing 10, and an outlet pipe 15 communicates with the interior of the casing 11, whereby the water delivered into the casing 10 from either or both pipes 13, 14, flows up through the tube 12 into the casing 11 and thence escapes by way of the outlet pipe 15. The interior of the casing 10 thus constitutes a mixing chamber 16 for the hot and cold water supplied by the pipes 13, 14. In the present instance the connection between each of these pipes and the mixing chamber comprises a valve chamber 17 constituted by a flanged cup 18 secured to the adjacent head of the casing 10, said cup having a threaded neck to receive the end of the supply pipe, and said valve chamber having controllable communication with the mixing chamber through a circular series of spaced ports 19 in the adjacent head of the casing 10. The communication through the inlet ports 19 of the heads is effected by valves 20, 21, respectively, contained in the chambers 17, each of which valves preferably comprises a disk fast on a stud-shaft 22 having its bearing in the adjacent head of the casing 10. Each valve disk has a circular series of transverse ports 23 corresponding in number and position with the ports 19 and being adapted to be moved into or out of registry with the latter ports by the act of partially rotating the valve disk on its axis. The valves 20, 21 are so arranged in relation to each other and to the respective ports 19, that when one valve is in fully open position the other valve is in fully closed position. Hence by simultaneously turning the valves to a predetermined extent the communication of the respective pipes 13, 14 with the mixing chamber can be adjusted in order to permit the supply of hot and cold water to the mixing chamber in regulated proportions.

The stud-shafts 22 project into the mixing chamber and have fast on their inner ends mutilated bevel gears 24 (or sectors) with which meshes a similar gear 25 fast on a vertical shaft 26 of special construction, constituting a thermostatic device. This shaft, which extends longitudinally through and is encased by the tube 12, is stepped in a bearing 27 at the foot of the casing 10 and is journaled at its upper end in a bearing 28 within the casing 11, and hence when the shaft is partially rotated it effects through the gearing above described corresponding rotation of the valves 20, 21. The shaft 26, in its preferred form, comprises a tube flattened and twisted into spiral form through a substantial portion of its length, as at 29, which tube is closed at its respective ends and is filled with a heavy expansible liquid having a high melting point, such, for example, as linseed or paraffin oil. If this shaft be fixedly held at its upper end and be subjected to the influence of varying temperatures the contained liquid will be caused to expand or contract to a greater or less extent according to the degree of heat, and the spiral portion of the shaft will have imparted thereto a rotary motion within a relatively large or small arc, to the right or left, which motion is, perforce, transmitted with great power through the lower end of the shaft to the gear 25 and thence through the gears 24 to the respective valves 20, 21.

In the present instance the upper end of the tubular thermostatic shaft is permanently closed by an imperforate plug 30 and screw cap 31 (Fig. 6), and the lower end of the shaft is provided with a centrally perforated plug 32 (Fig. 7) which, after the shaft is filled with liquid, is hermetically sealed by means of a tapering pin 33. A cap member 34 having a cone-pointed stud 35 adapted to be seated in the socket bearing 27, is then screwed upon the lower end of the shaft so as to enclose the projecting end of the pin and lock it securely in place.

The shaft 26 has affixed thereto, within the upper casing 11, a mutilated bevel gear 36 (or sector) with which meshes a similar gear 37 on a stud-shaft 38 having its bearing in a wall of said casing. The outer end of the stud-shaft 38 is provided with a suitable handle 39, by the manipulation of which the stud-shaft 38 may be turned to a predetermined extent, to the right or to the left, and thus, through the gears 36, 37 effect a corresponding rotation of the thermostatic shaft 26 in order to set the valves 20, 21 for the influx to the mixing chamber of predetermined proportionate volumes of hot and cold water. Such water mixes in the chamber and flows up through the tube 12 and casing 11, to the pipe 15, whence it is discharged at the desired temperature.

So long as the predetermined temperature of the water delivered by the pipe 15 is maintained the condition of the thermostatic shaft 26 will be unaffected and the two valves will thus remain in their adjusted position, but if, for any reason, the water exceed a certain maximum temperature, say 105° F., caused, for example, by increased pressure of the inflowing hot water or by decreased pressure of the inflowing cold water to the mixing chamber, the increased heat to which the thermostatic shaft is subjected will cause the expansion of the liquid contained in the shaft and thus effect a partial rotation of the latter; thereby actuating the valves in such a manner as to reduce the flow of hot water and increase the flow of cold water to the mixing chamber. The temperature of the water flowing through the structure thus being naturally lowered the thermostatic shaft will automatically resume its normal or contracted condition and, perforce, the valves will be positively returned to their former relative positions as prescribed by the adjustment of the handle 39. If however, the flow of the cold water through the supply pipe 14 should be materially reduced from any cause, the hot water entering the chambered structure, if above the critical temperature, will act upon the thermal device to such an extent as to operate the valves sufficiently to shut off entirely the inlet ports for hot water and to open fully the inlet ports for the cold water.

I preferably provide the handle with an index finger or pointer 40 and attach to the adjacent wall of the upper casing 11 a suitable disk or dial 41 whereby the proper position of the handle, for the inflow of predetermined volumes of either hot or cold water, or a mixture of both, can be readily indicated.

It is to be understood that I do not limit my invention to the exact details of construction herein disclosed, as the apparatus and its component parts may be modified in various respects within the principle of the invention and the scope of the appended claims.

I claim—

1. In thermostatic valve mechanism, a structure comprising a mixing chamber, cold and hot water supply pipes leading to said chamber, and having an outlet pipe in communication with said chamber, valves for controlling communication between said supply pipes and the mixing chamber, a thermostatic shaft mounted in said structure in the path of the water to the outlet pipe, said shaft having a spirally twisted portion, and operative connections between the thermostatic shaft and the said valves.

2. In thermostatic valve mechanism, a structure comprising a mixing chamber, cold and hot water supply pipes leading to said chamber, and an outlet pipe in communication with the said chamber, rotary valves for controlling communication between said supply pipes and the mixing chamber, gears for said valves, a thermostatic shaft mounted in said structure in the path of the water to the outlet pipe, said shaft having a spirally twisted portion, and a gear on said shaft in mesh with the valve gears.

3. In thermostatic valve mechanism, a structure comprising a mixing chamber, cold and hot water supply pipes leading to said chamber, and an outlet pipe communicating with the said chamber, rotary valves for controlling communication between said supply pipes and the mixing chamber, gears for said valves, a thermostatic shaft journaled at its ends in said structure, said shaft being disposed in the path of the water to the outlet pipe, a gear on said shaft in mesh with the valve gears, manually controlled means on said structure, and operative connections between said means and the thermostatic shaft for adjusting the latter.

4. In thermostatic valve mechanism, a structure comprising two casings, the interior of one of which constitutes a mixing chamber, a tubular connection between said casings, cold and hot water supply pipes communicating with one of said casings and an outlet pipe communicating with the other casing, valves for controlling communication between said supply pipes and the mixing chamber, a thermostatic shaft mounted in said structure and having a spirally twisted portion, and operative connections between the thermostatic shaft and the said valves.

5. In thermostatic valve mechanism, a structure comprising two casings, the interior of one of which constitutes a mixing chamber, a tubular connection between said casings, cold and hot water supply pipes communicating with one of said casings and an outlet pipe communicating with the other casing, rotary valves for controlling communication between said supply pipes and the mixing chamber, gears for said valves, a thermostatic shaft mounted in said structure and having a spirally twisted portion, and a gear on said shaft in mesh with the valve gears.

6. In thermostatic valve mechanism, a structure comprising two casings, the interior of one of which constitutes a mixing chamber, a tubular connection between said casings, cold and hot water supply pipes communicating with one of said casings and an outlet pipe communicating with the other casing, rotary valves for controlling communication between said supply pipes and the mixing chamber, gears for said valves, a thermostatic shaft journaled at its ends in said casings respectively, and having a spirally twisted portion, a gear on said shaft in mesh with the valve gears, manually controlled means on said structure, and operative connections between said means and the thermostatic shaft for adjusting the latter.

Signed at New York in the county and State of New York this 12th day of November A. D. 1920.

PAUL MIRK.